US005651385A

United States Patent [19]

Karte

[11] Patent Number: 5,651,385

[45] Date of Patent: Jul. 29, 1997

[54] SERVO DRIVE OPERATED BY A PRESSURE MEDIUM

[75] Inventor: Thomas Karte, Lemgo, Germany

[73] Assignee: Mannesmann Aktiengesellschaft, Dusseldorf, Germany

[21] Appl. No.: 512,880

[22] Filed: Aug. 9, 1995

[30] Foreign Application Priority Data

Aug. 9, 1994 [DE] Germany .......................... 44 29 401.8

[51] Int. Cl.$^6$ .................................................... F16K 31/42

[52] U.S. Cl. .................... 137/83; 137/487.5; 137/625.61

[58] Field of Search .................................. 137/487.5, 83, 137/625.61

[56] References Cited

U.S. PATENT DOCUMENTS

| | | | |
|---|---|---|---|
| 4,855,659 | 8/1989 | Riensche | 137/487.5 X |
| 5,126,934 | 6/1992 | MacFadyen | 137/487.5 X |
| 5,197,328 | 3/1993 | Fitzgerald | 137/487.5 X |
| 5,431,182 | 7/1995 | Brown | 137/487.5 X |

FOREIGN PATENT DOCUMENTS

| | | | |
|---|---|---|---|
| 0558192 | 9/1993 | European Pat. Off. . | |
| 1119071 | 11/1961 | Germany | 137/625.61 |
| 2023504 | 11/1970 | Germany | 137/625.61 |

*Primary Examiner*—Stephen M. Hepperle

*Attorney, Agent, or Firm*—Cohen, Pontani, Lieberman, Pavane

[57] ABSTRACT

A device for operating a servo drive having a positioning element controlled by a pressure medium. The device includes an electrical control unit generating a control signal based upon the position of the positioning element, a pre-control system connected to receive the control signal through an electrical control path and a main control system controlled by the pre-control system to operate the servo drive by moving the positioning element. A switching element is positioned between the electrical control unit and the pre-control system and opens the electrical control path prohibiting the transmission of the control signal upon detecting operation malfunction. Upon opening of the control path, the pre-control system acts to switch the main control system into a deventilation mode and said positioning element is moved into a predetermined "fail safe" position deventilating the positioning volume of the drive.

8 Claims, 1 Drawing Sheet

SERVO DRIVE OPERATED BY A PRESSURE MEDIUM

BACKGROUND OF THE INVENTION

1. Field of the Invention

The present invention relates to pressure operated drives and, more particularly, to control of the drive in the event of system malfunction.

2. Description of the Related Art

Pressure operated drives, especially pneumatic drives, are well known and often used to actuate translatory or rotatory controlling elements or valves in process engineering. Pneumatic drives are well suited for use in systems subject to explosion protection standards as no protective measures are needed for these drives. When such drives contain electric or electronic components they are normally designed in accordance with known and accepted intrinsically safe ignition protection standards. Many pressure operated drives employ a nozzle/flapper system as is known from German laid open document No. DE 41 42 269 for supplying and controlling flow of a pressure medium to the drive.

Pneumatic servo drives recently have been designed to assume a fail safe position in the event of system failure or malfunction to prevent endangerment to the entire system. These drives include deventilation valves to ensure a defined state of both the drive and controlling element in such events. During normal operation the drive is directly controlled by a preset pressure valve or with the help of a positioner, but upon occurrence of an emergency the deventilation valve acts to open the drive volume of the drive to the atmosphere resulting in deventilation and a spring moves the pneumatic drive into a safe position in which damage to the drive during such operation is prevented. The output of the deventilation valve is designed so that its effect overrides that of the components regulating the position of the drive during normal operation. This deventilation valve is normally designed as a magnetic valve and controlled by a separate signal from a measurement station.

At the same time as the deventilation valve opens the drive volume the controlling flow produces an actuating force, via the electromagnetic interaction between the measurement station and the deventilation valve, which moves the pneumatic valve cone or valve slide. The design of this system has the problem of needing high electric driver wattages of approximately 1 watt. These high wattages are not compatible with intrinsically safe systems of ignition protection according to standard DIN EP 50020 as is usually desired for such pneumatic servo drives. In order to meet the applicable explosion standards for safe operation of such systems in their normal operating environment, other types of ignition protection systems, for example, flameproof housings must be used which greatly increase the cost of the device.

Such deventilation valves are known from the brochure "SAMSOMATIC, Magnetic Valve Technology" by SAMSON AG. The deventilation valves described in this brochure are mounted on the valves by additional casing on the pressure medium side. However, the attachment of these valves and the embodiment needed to meet the explosion protection standards cause the system to be very expensive.

It is thus desirable to provide a pneumatic servo drive which is able to implement an inexpensive rapid deventilation system in an intrinsically safe ignition protection system.

SUMMARY OF THE INVENTION

The present invention is a device for operating a servo drive having a positioning element controlled by a pressure medium, preferably air. The device combines a positioner and a deventilation system in the same housing in a simple manner. It includes an electrical control unit which monitors the position of the positioning element, i.e. a diaphragm or piston, of the drive and generates a control signal in response to its position in accordance with conventional technology. A precontrol system is connected to receive the control signal from the electrical control unit through a control path and create a pressure in a control line in response thereto. The pressure is applied through the control line to a main control system which directs the pressure to control the position of the control element of the servo drive. Between the control unit and pre-control system is a switch element which is able to sense an operational malfunction and disconnect the control unit from the pre-control system. When an operational malfunction is sensed, the pre-control system controls the flow of the pressure medium which acts to switch the main control system into a deventilation mode, opening a drive volume of the servo drive to the atmosphere and causing the control element of the servo drive to move into a predetermined fail safe position thus protecting the drive and the rest of the system from possible damage due to the malfunction of the device. Such an operational malfunction may result from an electrical failure as results from a loss of power, or from any other operational or hardware failure producing similar results.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

DETAILED DESCRIPTION OF THE PRESENTLY PREFERRED EMBODIMENTS

Figure 1:
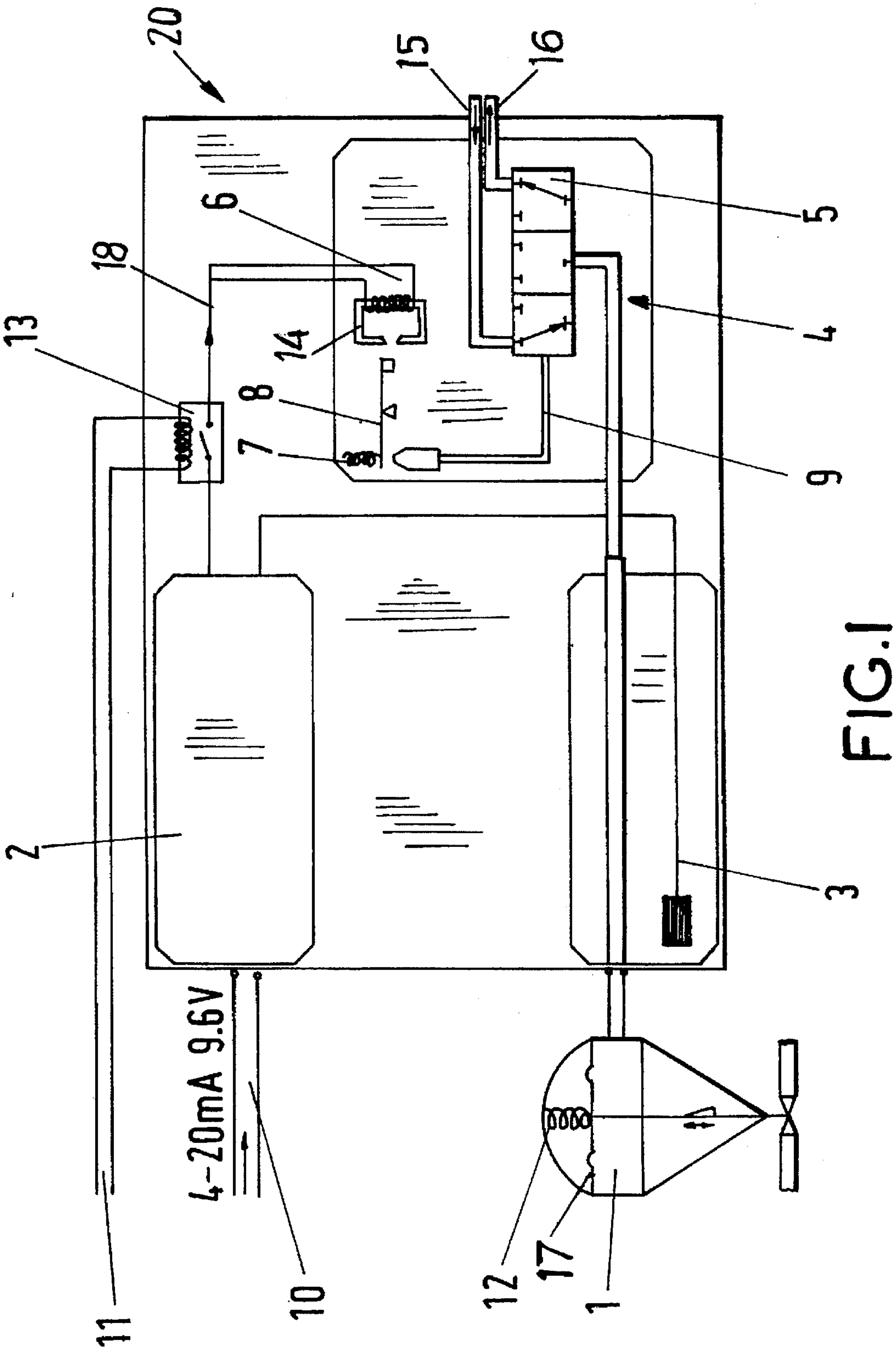
FIG. 1 is a schematic diagram of the position controller and servo valve of the present invention.

The present invention will now be described in more detail with reference to FIG. 1. This FIGURE shows the position controller 20 of the present invention connected to a pneumatic drive 1.

The pneumatic drive 1 is connected to a position sensor 3 which measures the position of a control element 17, e.g. a diaphragm or piston, of the drive through conventional methods. The position sensor 3 is electrically connected to an electrical control signal generator 2 to which it transmits a control variable indicative of the measurement position of the control element 17 in accordance with conventional technology. The electrical control signal generator 2 compares the control variable to a target value stored therein and generates a control signal based upon this comparison indicating any deviation of the control variable from the target value. The electrical control signal generator 2 is supplied with power through supply lines 10, this power is normally of the order of 9.6 V and a current of 4–20 mA. Power may alternately be supplied by electrical control lines 11.

The electrical control signal generator 2 is connected to a pre-control system 6 including a nozzle/flapper system 8 through a control path 18. A relay 13 is present along the control path 18 between the electrical control signal generator 2 and the pre-control system 6. The relay 13 is connected to and controlled by electrical control lines 11; the power transferred through the control lines 11 is within acceptable well-known standards for an "intrinsically safe" ignition protection system. The control signal generated in the electrical control signal generator 2 is applied to an actuating magnet 14 of the pre-control stage 6 through the control path 18 and the relay 13. The magnet 14 generates an electromagnetic signal which acts to control the position of the nozzle/flapper system 8 based upon the magnitude of the control signal. The nozzle/flapper system 8 controls the flow of a pressure medium which may be, for example, compressed air, gas, water, etc. although air is preferred to a main stage valve 5 through a pressure control line 9 connected therebetween whereby the main stage valve 5 directs the pressure medium to the pneumatic drive 1 causing the control element 17 of the pneumatic drive 1 to move to the proper position. The nozzle/flapper system is described for purposes of example but any device capable of controlling the flow of the pressure medium to the main stage valve 5 may be used.

Connected to the nozzle/flapper system 8 is a spring 7 which acts against the force exerted on the flapper by the magnet 14. The use of a spring 7 acting on the nozzle/flapper system 8 is for purposes of example only. The use of a spring or other resetting elements based on a spring force depend on the precise embodiment of the pre-control system 6. Generally, in the various embodiments of the pre-control system 6, a resetting spring or at least a spring element moving the pre-control system 6 into a defined position is provided. The spring 7 may be designed as a spiral spring, a spring strip or any other type of conventional spring able to accomplish the intended purpose and it can act as a tension spring or a compression spring. The overall force acting on the nozzle/flapper system is a combination of the force of the spring 7 and the magnetic force applied by the magnet 14. Assuming the spring operates under tension, if the force of the magnet 14 acts to move the nozzle/flapper system 8 towards the nozzle of the control line 9 the spring 7 tension will be increased, and, if the force of the magnet 14 acts to move the nozzle/flapper system 8 away from the nozzle of the control line 9, the tension on the spring 7 will be decreased. Assuming the spring 7 operates under compression, if the force of the magnet 14 acts to move the nozzle/flapper system 8 towards the nozzle of the control line 9, the spring compression will be decreased, and, if the force of the magnet 14 acts to move the nozzle/flapper system 8 away from the nozzle of the control line 9, the spring compression will be increased. Of course, the position of the spring 7 in this system will determine the compression or tension thereon. The position of the spring 7 shown in the drawing and the related discussion are for purposes of example only and not meant to limit the present invention.

When the force of the magnet is removed, i.e. the relay is opened and no current flows to the magnet, the spring 7 will return to a relaxed state, moving the nozzle/flapper system 8 into a fail-safe position defined by the position of the nozzle/flapper system 8 which will create a pressure through the control line 9 able to switch the main stage valve 5 into a deventilation mode.

The main stage valve 5 includes an input port 15 and output port 16 for use in a deventilation mode, e.g., when the system encounters an operational malfunction. Furthermore, the pneumatic drive 1 includes a spring 12 which acts in the same manner as the spring 7 described hereinbefore to move the control element 17 into a position called a fail-safe position defined by the position of the control element 17 when the spring 12 is in its relaxed state and the drive volume of the drive is open to the atmosphere. The fail-safe position is the position to which the control element 17 is moved for deventilating the drive volume of the drive and thus removing the pressure medium through the output port 16 of the main stage valve. As the drive volume is open to the atmosphere, the spring 12 acts alone to move the control element 17 until the spring 12 is in a relaxed position removing either the tension or compression thereon caused by the pressure medium acting on the control element 17. The movement of the spring 12 thus deventilates the drive volume of the drive upon operational malfunction of the system. The pre-control system 6 includes the actuating magnet 14, nozzle/flapper system 8, and spring 7 and is combined with the pressure control line 9 and main stage valve 5 to form a single pneumatic unit 4.

In operation, power is supplied through the electrical control lines 11 to thereby close the relay 13 and connect the electrical control signal generator 2 with the pre-control system 6. The position sensor 3 senses the position of the pneumatic drive 1 and transmits a control variable indicative of the position of control element 17 to the electrical control signal generator 2. The control signal generator 2 receives power through supply lines 10. A control signal is generated in the electrical control signal generator 2 and supplied through the relay 13 to the actuating magnet 14 in the pre-control stage 6. The relay 13 is held closed by the voltage supplied through the electrical control lines 11. The magnet 14 exerts a magnetic force on the nozzle/flapper system 8 in opposition to spring 7 to control the opening into pressure control line 9 thereby controlling the flow of the pressure medium through the pressure control line 9. This in turn controls the pressure applied to main stage valve 5 and thus determines the flow path of the medium through the main stage valve 5. This medium then flows through the main stage valve 5 and into the pneumatic drive 1 acting in opposition to the spring 12 to control the position of the control element 17 therein. The main stage valve 5 is set during normal operation to direct the pressure medium to flow into the pneumatic drive 1 and act on the control element 17.

When a system malfunction such as electrical failure occurs, e.g. loss of power on the electric control line 11, the relay 13 opens. The control signal is thus prevented from reaching the actuating magnet 14 and the magnetic control force opposite to the force of spring 7 is prevented from acting on the nozzle/flapper system 8. Hence, the spring 7 acts alone on the nozzle/flapper system 8 to place the system into a predetermined safe position which creates a pressure through the control line 9 sufficient to cause switching of the main stage valve 5 into a deventilation mode for deventilating the pneumatic drive 1. The main stage valve 5 redirects the flow of the pressure medium to flow through the deventilation port 16 and opens the drive volume of the drive 1 to the atmosphere. The reset spring 12 in the pneumatic drive 1 then acts on the control element 17 causing it to move into a "fail safe" position in which the pressure medium is removed from the drive volume of the drive through the main stage valve 5 and its output port 16. As the drive volume is opened to the atmosphere through the main stage valve 5, the drive volume is deventilated by the motion imparted to the control element 17 by the spring 12.

The design of the present invention integrates the positioner and emergency or deventilation valve in the same housing wherein they each perform their defined functions. This greatly reduces the cost of the system as no separate housing or pneumatics are required. The cost is further reduced as no separate pneumatic casing is needed. This design also increases the functional safety and provides a decreased possibility of accidents occurring as the positioner may be compactly mounted on the drive without a free casing. Furthermore, as the device uses a low control power in accordance with known and accepted "intrinsically safe" type ignition protective standards there is no need for avoidance solutions otherwise necessary for operation of conventional positioners using a deventilation valve in a correspondingly explosion-protected fashion. Thus, the integration of the deventilation valve, i.e. main stage valve 5, into the positioner 20 thus simplifies the construction of the device and improves the reliability of system due to this mechanical and electrical simplification of the construction.

The invention is not limited by the embodiments described above which are presented as examples only but can be modified in various ways within the scope of protection defined by the appended patent claims.

I claim:

1. A device for operating a servo drive including a drive volume; and a positioning element movable within the drive volume and controlled by a pressure medium, said device comprising an electrical control unit for generating a control signal based upon the position of the positioning element; an electrical control path; a precontrol system operating in accordance with a principle of flow/pressure conversion and connected to receive said control signal from said electrical control unit via said electrical control path; and a main control system operable in both a ventilation and deventilation mode and controlled by said pre-control system to adjust said positioning element;

said device further comprising a switching element coupled to said electrical control path and interposed between said electrical control unit and said pre-control system for sensing operational malfunction of the device and for disconnecting said pre-control system from said electrical control unit upon sensing operational malfunction, said pre-control system including means for switching said main control system into said deventilation mode to thereby deventilate said drive volume of the drive upon disconnection from said electrical control unit.

2. The device as claimed in claim 1, wherein said pre-control system includes an electrically controlled nozzle/flapper system having a fail-safe position during operational malfunction.

3. The device as claimed in claim 2, wherein said means for switching said main control system includes a first spring element for moving said nozzle/flapper system to said fail-safe position when said pre-control system is disconnected from said electrical control unit.

4. The device as claimed in claim 3, wherein said pre-control system further includes a control line operatively connected to and acted upon by said nozzle/flapper system, said main control system comprising a pneumatically controlled directional valve connected to receive a control pressure from said pre-control system through said control line for acting on said directional valve to switch said directional valve into said deventilation state for deventilating the drive volume of the servo drive when said pre-control system is disconnected from said electrical control unit.

5. The device as claimed in claim 1, wherein said switching element is a relay.

6. The device as claimed in claim 1, wherein said switching element and said electrical control unit each include means for maintaining operating parameters within an intrinsically safe ignition protection range.

7. The device as claimed in claim 1, wherein said electric control unit includes a position sensor for monitoring the position of said positioning element.

8. The device as claimed in claim 1, further comprising a second spring element connected to the positioning element, said second spring element moving said positioning element into a predetermined position upon switching of said main control system into a deventilation mode.

* * * * *